United States Patent

Lukach et al.

[11] Patent Number: 5,407,475
[45] Date of Patent: Apr. 18, 1995

[54] THERMALLY STABLE THIOSULFATE HYDROXYETHYLCELLULOSE SUSPENSION

[75] Inventors: Carl A. Lukach, Greenville, Del.; Jose Zapico, Annaba, Algeria

[73] Assignee: Aqualon Company, Wilmington, Del.

[21] Appl. No.: 43,681

[22] Filed: Apr. 8, 1993

[51] Int. Cl.⁶ ................... C09D 101/28; E21B 43/16
[52] U.S. Cl. ................... 106/197.1; 106/194; 166/275
[58] Field of Search ............ 106/192.1, 194; 166/275

[56] References Cited

U.S. PATENT DOCUMENTS 3,955,998 5/1976 Clampitt et al. ............ 106/197.2
3,964,923 6/1976 Zetmeir ................... 106/189
5,028,263 7/1991 Burdick .................. 106/194

OTHER PUBLICATIONS

Huenicke et al., CA8L (24):162985v 1975 no month available.
*Cellosize*, Union Carbide Corporation, 1959, p. 22 no month available.

*Primary Examiner*—David Brunsman
*Attorney, Agent, or Firm*—David Edwards

[57] ABSTRACT

A storage and thermally stable polymer suspension in fresh water remains pourable after mixing at 6 months comprises at least 30% ammonium or sodium thiosulfate and 20% hydroxyethylcellulose. In an oil drilling fluid, yield value decreases less than 35% when heated for 16 hours at 250° F.

10 Claims, No Drawings

THERMALLY STABLE THIOSULFATE HYDROXYETHYLCELLULOSE SUSPENSION

FIELD OF THE INVENTION

The invention relates to aqueous salt suspensions of polymer. In particular the invention relates to a thermally, stable suspension of hydroxyethylcellulose in ammonium or sodium thiosulfate.

BACKGROUND OF THE INVENTION

Fluidized polymer suspensions which employ an inorganic salt are known from U.S. Pat. Nos. 4,283,229, 4,883,536 and 4,883,537. These salts include alkali metal and ammonium ion carbonates, phosphates and sulfates. Assignee's copending applications, Ser. Nos. 600,745, 706,332 and 700,334 employ sodium formate as the suspending salt.

SUMMARY OF THE INVENTION

It is an object of the invention to provide thermal and storage stable aqueous suspensions of hydroxyethylcellulose containing at least 30% by weight ammonium or sodium thiosulfate.

The suspensions are prepared by dissolving the ammonium or sodium thiosulfates in water and dispersing the hydroxyethylcellulose into the solution.

The suspensions are prepared with fresh water and remain pourable after mild stirring for six months.

DETAILED DESCRIPTION OF THE INVENTION

It has been discovered that hydroxyethylcellulose (well known as a nonionic thickening agent) can be protected against thermal degradation by thiosulfate salts. Hydroxyethylcellulose is available from the Aqualon Company as Natrosol® hydroxyethylcellulose (HEC). Grade HHXR is of high molecular weight. Grade EXR is low molecular weight. HEC is also available from Union Carbide and Daicel. HEC is widely used as a paint thickener and for other applications in food, cosmetics and pharmaceuticals.

Ammonium thiosulfate is a commodity chemical which is generally believed to be interchangeable with sodium thiosulfate. For example in photographic processing, "fixer" is usually sodium thiosulfate, while ammonium thiosulfate can also be substituted if desired.

The invention has industrial applicability for oil drilling fluids for deep wells where high temperatures create problems for existing drilling fluids. The following examples illustrate the practice of the invention.

EXAMPLES 1 and 2

An ammonium thiosulfate brine was prepared by dissolving 500 g ammonium thiosulfate in 500 g water. While 750 g of this solution was stirred with a Hamilton Beach mixer at 11,000 rpm, a 250 g portion of Natrosol® hydroxyethyl cellulose was added into the solution over 20 minutes. The procedure was repeated with a different HEC. Table 1 gives Brookfield LVF (25° C.) viscosity results over time for the two grades of Natrosol® HEC tested in the suspensions of the invention.

TABLE 1

| EX | HEC | t-o | t-1 day | 1 week | 1 month | 2 months |
|---|---|---|---|---|---|---|
| 1 | 250 HHXR | 260 | 230 | 210 | 150 | 240 |
| 2 | 250 EXR | 165 | 215 | 180 | 160 | 200 |

Both suspensions containing 25 wt. % HEC and 37.5 wt. % ammonium thiosulfate were stable and remained pourable after mild stirring even after six months storage.

EXAMPLES 3 and 4

Table 2 gives the Brookfield LVF (25%) viscosities of similar suspensions prepared by the procedure described in Example 1, using either ammonium thiosulfate or sodium thiosulfate with different samples of HEC 250 HHXR (Examples 3 and 4).

TABLE 2

| EX | HEC | t-1 day | 1 week | 1 month | 2 months |
|---|---|---|---|---|---|
| 3 | Ammonium Thiosulfate | 140 | 175 | 145 | 145 |
| 4 | Sodium Thiosulfate | 390 | 235 | 265 | 255 |

Although brine viscosities were different in both cases, reflecting a difference in solubility of the HEC in both brines, the viscosities of the suspensions were stable for two months in each case.

EXAMPLE 5

This example illustrates the efficiency of ammonium thiosulfate as a thermal stabilizer for a sea water polymer solution.

HEC was added to sea water in the amount of either 1 or 2 pounds per barrel (ppb); (one ppb is equivalent in metric units to 2,847 kg/m$^3$), with and without 30% by weight ammonium thiosulfate (A.T.). Yield values of lb/100 ft$^2$ (metric equivalent 1 lb./100 ft$^2$=0.5 Pa) were determined initially for these combinations and then after 16 hours at 250° F. (122° C.). Table 3 gives comparative results in which the decrease in yield value is expressed as a percentage.

TABLE 3

| HEC Conc. (ppb) | % A.T.[a] w/w HEC | Initial Y.V. | 16 hrs./250° F. Y.V. | % Y.V. Drop |
|---|---|---|---|---|
| 1 | 0 | 6 | 4.5 | 72 |
| 1 | 30 | 13 | 9 | 31 |
| 2 | 0 | 45 | 10 | 78 |
| 2 | 30 | 40.5 | 37 | 9 |

[a]A.T. = Ammonium Thiosulfate

These results show the surprising degree of thermal protection provided by the simple addition of ammonium thiosulfate whereby it is also possible to prepare storage stable suspensions as illustrated in Example 1.

EXAMPLE 6

Test were run similar to Examples 1-4 except that both ammonium thiosulfate and sodium thiosulfate were used in addition to other components, as shown in Table 4 below. In these tests, Natrosol® 250 HHRP hydroxyethylcellulose available from Aqualon was used as the polymer. A.T.=Ammonium Thiosulfate, S.T.=Sodium Thiosulfate.

TABLE 4

A. Ammonium Thiosulfate Suspensions

| | Fresh Water + 1 ppb NaOH | | | Salt Water (40 G/l NaCl) + 1 ppb NaOH | | |
|---|---|---|---|---|---|---|
| 250 HHRP (1.5 ppb) | | | | | | |
| | 4H at 25° C. | 16H at 250° C. | Drop % | 4H at 25° | 16H at 250° F. | Drop % |
| AV | 21.5 | 2 | 91 | 23 | 3.5 | 85 |
| PV | 13 | 2 | 85 | 13 | 3 | 77 |
| YV | 17 | 0 | 100 | 20 | 1 | 95 |
| 250 HHRP (1.5 ppb) + 0.45 ppb NH4 thiosulfate (30%/HEC) (solid) | | | | | | |
| AV | 22 | 4.5 | 80 | 23.5 | 8 | 66 |
| PV | 12 | 4 | 67 | 14 | 7 | 50 |
| YV | 20 | 1 | 95 | 19 | 2 | 37 |
| A.T. Suspension (6 ppb) 1.5 ppb HEC: 2.25 ppb A.T.) (150% HEC) | | | | | | |
| AV | 27.5 | 23.5 | 15 | 26.5 | 23.5 | 11 |
| PV | 13 | 14 | +8 | 14 | 15 | +7 |
| YV | 29 | 19 | 34 | 25 | 17 | 32 |

| | Fresh Water + 1 ppb MgO | | | Salt Water (40 G/l NaCl) + 1 ppb MgO | | |
|---|---|---|---|---|---|---|
| 250 HHRP (1.5 ppb) | | | | | | |
| | 4H at 25° C. | 16H at 250° C. | Drop % | 4H at 25° | 16H at 250° F. | Drop % |
| AV | 24 | 16.5 | 31 | 24 | 12.5 | 48 |
| PV | 13 | 12 | 8 | 13 | 11 | 15 |
| YV | 22 | 9 | 59 | 22 | 3 | 86 |
| 250 HHRP (1.5 ppb) + 0.45 ppb NH4 thiosulfate (30%/HEC) (solid) | | | | | | |
| AV | 24 | 17.5 | 27.5 | 25 | 17.5 | 30 |
| PV | 13 | 13 | 0 | 14 | 13 | 8 |
| YV | 22 | 11 | 50 | 22 | 11 | 50 |
| A.T. Suspension (6 ppb) 1.5 ppb HEC: 2.25 ppb A.T.) (150% HEC) | | | | | | |
| AV | 25.5 | 20 | 22 | 26 | 18 | 11 |
| PV | 14 | 13 | 7 | 14 | 15 | 0 |
| YV | 23 | 14 | 39 | 16 | 17 | 33 |

| | Fresh Water | | | Salt Water (40 g/l NaCl) | | |
|---|---|---|---|---|---|---|
| A.T. Suspension (6 ppb) 1.5 ppb HEC: 2.25 ppb A.T.) (150% HEC) | | | | | | |
| AV | 25.5 | 3.5 | 86 | 26.5 | 3 | 89 |
| PV | 14 | 3 | 79 | 14 | 2 | 86 |
| YV | 23 | 1 | 96 | 25 | 2 | 92 |

B. Sodium Thiosulfate Suspensions

| | Fresh Water + 1 ppb NaOH | | | Salt Water (40 g/l NaCl) + 1 ppb NaOH | | |
|---|---|---|---|---|---|---|
| 250 HHRP (1.5 ppb) | | | | | | |
| | 4H at 25° C. | 16H at 250° C. | Drop % | 4H at 25° | 16H at 250° F. | Drop % |
| AV | 21.5 | 2 | 91 | 23 | 3.5 | 85 |
| PV | 13 | 2 | 85 | 13 | 3 | 77 |
| YV | 17 | 0 | 100 | 20 | 1 | 95 |
| 250 HHRP (1.5 ppb) + 0.45 ppb Na thiosulfate (30%/HEC) (solid) | | | | | | |
| AV | 21.5 | 3.5 | 84 | 23 | 5 | 78 |
| PV | 12 | 4 | 67 | 14 | 5 | 61 |
| YV | 20 | 1 | 95 | 19 | 1 | 95 |
| S.T. Suspension (6 ppb) 1.5 ppb HEC: 2.25 ppb A.T.) (150% HEC) | | | | | | |
| AV | 22.5 | 10 | 56 | 23 | 12.5 | 46 |
| PV | 12 | 8 | 33 | 13 | 10 | 23 |
| YV | 21 | 4 | 81 | 20 | 5 | 75 |

| | Fresh Water + 1 ppb MgO | | | Salt Water (40 G/l NaCl) + 1 ppb MgO | | |
|---|---|---|---|---|---|---|
| 250 HHRP (1.5 ppb) | | | | | | |
| | 4H at 25° C. | 16H at 250° C. | Drop % | 4H at 25° | 16H at 250° F. | Drop % |
| AV | 24 | 16.5 | 31 | 15.5 | 48 | 48 |
| PV | 13 | 12 | 8 | 11 | 11 | 15 |
| YV | 22 | 9 | 59 | 3 | 3 | 86 |
| 250 HHRP (1.5 ppb) + 0.45 ppb Na thiosulfate (30%/HEC) (solid) | | | | | | |
| AV | 24 | 17.5 | 27 | 19 | 17.5 | 24 |
| PV | 13 | 13 | 0 | 14 | 13 | 8 |
| YV | 22 | 9 | 59 | 10 | 11 | 55 |
| S.T. Suspension (6 ppb) 1.5 ppb HEC: 2.25 ppb A.T.) (150% HEC) | | | | | | |
| AV | 26 | 21 | 19 | 22.5 | 18 | 15 |
| PV | 14 | 14 | 0 | 14 | 15 | 0 |
| YV | 24 | 14 | 42 | 17 | 17 | 32 |

| | Fresh Water | | | Salt Water (40 g/l NaCl) | | |
|---|---|---|---|---|---|---|
| S.T. Suspension (6 ppb) 1.5 ppb HEC: 2.25 ppb A.T.) (150% HEC) | | | | | | |
| AV | 26 | 3 | 88 | 26.5 | 3 | 89 |
| PV | 14 | 2 | 86 | 14 | 2 | 86 |
| YV | 24 | 2 | 92 | 25 | 2 | 92 |

EXAMPLE 7

Table 5 summarizes the effects of addition of HEC suspensions in thiosulfates, as percent drop V after 16 hours at 250° F. in properties.

TABLE 5[a]

|  | After 16 Hours at 250° F. Percent Drop In | | | | | |
|---|---|---|---|---|---|---|
|  | Apparent Viscosity | | Plastic Viscosity | | Yield Point | |
|  | (b) | (c) | | | | |
| Medium | A.T. | S.T. | A.T. | S.T. | A.T. | S.T. |
| FW (fresh water | 86 | 88 | 79 | 86 | 96 | 92 |
| FW + NaOH (1 ppb) | 15 | 56 | 0 | 33 | 34 | 81 |
| FW + MgO (1 ppb) | 22 | 19 | 7 | 0 | 39 | 42 |
| SW (4% NaCl) | 89 | 89 | 86 | 86 | 92 | 92 |
| SW + NaOH (1 ppb) | 11 | 46 | 0 | 23 | 32 | 75 |
| SW + MgO (1 ppb) | 18 | 15 | 0 | 0 | 33 | 32 |

[a]Suspension is 37.5% thiosulfate and 25% HEC in 37.5% H$_2$O. Used 6 ppb [1.5 ppb HEC; 2.5 ppb thiosulfate (150% based on HEC)]
[b]A.T. = Ammonium Thiosulfate
[c]S.T. = Sodium Thiosulfate Conclusions from Table 5

1. In FW and SW alone, neither ammonium thiosulfate (A.T.) nor sodium thiosulfate (S.T.) provided thermal stability to HEC in suspension form by any of three indicators (Apparent Viscosity, Plastic Viscosity or Yield Point).

2. With 1 ppb NaOH present, A.T. is a more effective thermal stabilizer than S.T. in both FW and SW. Both provide some thermal stability. Plastic viscosity indicates this best.

3. The best thermal stability is provided with 1 ppb MgO present, in either FW or SW. Both S.T. and A.T. are about equally effective, with S.T. being slightly preferred. The best indicator is Plastic Viscosity or Apparent Viscosity.

EXAMPLE 8

Table 6 summarizes the effect of addition of 30% solid thiosulfate on thermal stability of HEC in different media, after 16 hours at 250° F.

TABLE 6

|  | After 16 Hours at 250° F. Percent Drop In | | | | | |
|---|---|---|---|---|---|---|
|  | Apparent Viscosity | | Plastic Viscosity | | Yield Point | |
|  | (a) | (b) | | | | |
| Medium | A.T. | S.T. | A.T. | S.T. | A.T. | S.T. |
| FW (fresh water)[c] | — | — | — | — | — | — |
| FW + NaOH (1 ppb) | 80 | 84 | 67 | 75 | 95 | 95 |
| FW + MgO (1 ppb) | 28 | 27 | 0 | 0 | 50 | 59 |
| SW (4% NaCl)[c] | — | — | — | — | — | — |
| SW + NaOH (1 ppb) | 66 | 78 | 50 | 61 | 37 | 95 |
| SW + MgO (1 ppb) | 30 | 24 | 8 | 0 | 50 | 55 |

[a]A.T. = Ammonium Thiosulfate
[b]S.T. = Sodium Thiosulfate
[c]No thickening effect Conclusions from Table 6

1. With 1 ppb NaOH present, in FW neither A.T. nor S.T. provide much thermal stability. In SW, A.T. provides somewhat better stability than S.T. Yield Point indicates the best stability.

2. The best thermal stability is provided with 1 ppb MgO present, both in FW and SW. Both S.T. and A.T. are about equally effective. Plastic Viscosity and Apparent Viscosity are the best indicators.

What is claimed is:

1. An aqueous suspension comprising at least 20% by weight of hydroxyethylcellulose dispersed in an aqueous solution of sodium thiosulfate, wherein the sodium thiosulfate comprises at least 30% by weight of the total weight of the suspension and wherein the suspension is stable against thermal viscosity loss and remains stable and pourable after stirring for up to 6 months.

2. The suspensions of claim 1 where the ammonium or sodium thiosulfate comprises at least 35% by weight and the hydroxyethylcellulose comprises at least 25% by weight of the total weight of the suspension.

3. A thermally stable oil drilling fluid comprising at least 1 pound per barrel of hydroxyethylcellulose and at least 30% by weight of ammonium or sodium thiosulfate based on the weight of hydroxyethylcellulose and further comprising magnesium oxide.

4. The thermally stable oil drilling fluid of claim 3 wherein the thiosulfate comprises at least 35% by weight of the total weight of the fluid.

5. The thermally stable oil drilling fluid of claim 3 wherein the hydroxyethylcellulose comprises at least 25% by weight of the total weight of the fluid.

6. A process for drilling deep wells where high temperatures create problems for existing fluids comprising adding the thermally stable oil drilling fluid of claim 3 to the deep well and then drilling the well whereby the drilling fluid remains thermally stable.

7. A thermally stable oil drilling fluid comprising at least 1 pound per barrel of hydroxyethylcellulose and at least 30% by weight of ammonium or sodium thiosulfate based on the weight of hydroxyethylcellulose and further comprising sodium hydroxide.

8. The thermally stable oil drilling fluid of claim 7 wherein the thiosulfate comprises at least 35% by weight of the total weight of the fluid.

9. The thermally stable oil drilling fluid of claim 7 wherein the hydroxyethylcellulose comprises at least 25% by weight of the total weight of the fluid.

10. A process for drilling deep wells where high temperatures create problems for existing fluids comprising adding the thermally stable oil drilling fluid of claim 7 to the deep well and then drilling the well whereby the drilling fluid remains thermally stable.

* * * * *